Dec. 2, 1958   S. B. WICZER   2,862,284
MODIFIED FILAMENT AND METHOD
Filed May 4, 1953
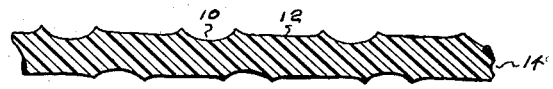
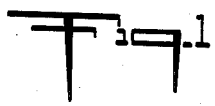
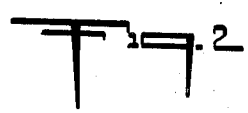
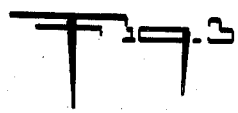
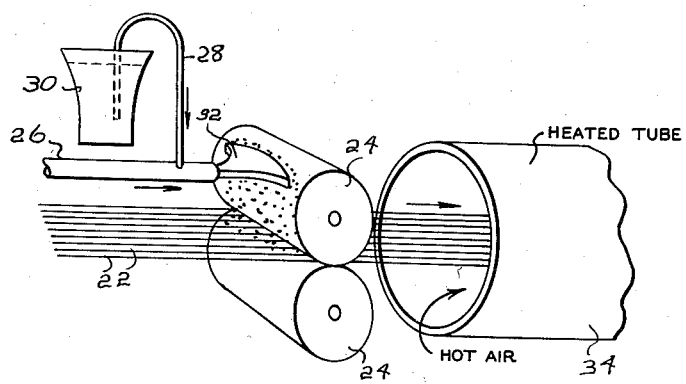
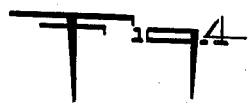
INVENTOR

United States Patent Office 2,862,284
Patented Dec. 2, 1958

2,862,284

MODIFIED FILAMENT AND METHOD

Sol B. Wiczer, Washington, D. C.

Application May 4, 1953, Serial No. 353,003

8 Claims. (Cl. 28—82)

This invention relates to synthetic fiber modified to produce therein surface irregularity by treating the filament with a gas forming agent after forming into filament whereby the surface has acquired an irregular bubbly character and to the method of producing the same.

According to the present invention, the synthetic plastic has incorporated in the surface a gas forming agent to acquire after generation of the gas a foamy surface texture and most desirably, for purposes hereof, a texture wherein the surface has a series of pores formed by the expansion of gases therefrom during a stage of formation wherein plastic material is sufficiently pliable to be slightly deformed by expansion of the gas but sufficiently set in the filament form to avoid destruction of its filamentary character. As this invention is preferably practiced, an agent, herein called a blowing agent, comprising an unstable compound capable of developing a gas by decomposition as by application of heat or by reaction with subsequently applied reagent is associated with plastic material after being formed into filaments to impart to the surface by expansion of the gas the desired porous surface characteristics hereof.

The specific handling procedure for developing the gas and consequent surface porosity in the filament will vary slightly with organic plastic materials from which the filament is formed depending upon specific physical and chemical characteristics of the plastic material.

Where the plastic is a thermoplastic material such as linear super-polyamide such as nylon, linear polyester such as polyethylene terephthalate, polyacrylonitrile, or other thermoplastic materials capable of extrusion into filaments by fluidizing the plastic with heat and setting the filament by cooling, the gas blowing agent may be coated as a dust upon the filament while it is still sufficiently soft to adhere thereto, the blowing agent being rubbed into the filament by pressure, such as passing the softened filament through polished rolls wherein the powdered blowing agent is carried upon the surface, and thereafter the filament is given another heat treatment sufficient to decompose the blowing agent coating without destroying the normal useful strength or continuous strand character of the filament. In such process the blowing agent, such as an azo compound will be selected to decompose at a temperature below that at which the plastic is substantially molten, i. e. at a temperature wherein the plastic is merely soft.

In another procedure where the filament is set by a chemical coagulation bath, as usually used for cellulose filaments, the coagulated filament, while still swollen and gelatinous prior to drying, may have the gas forming agent dusted thereon which may be either acid reactive, i. e. reactive with the acid solution clinging to the swollen filament from the coagulating bath, such as by dusting sodium carbonate on the acid wet filament, or since cellulose filaments are thermally stable at substantially raised temperatures, the blowing agent dusted upon the swollen filament may be such as is activated by heat, and may be dusted upon the wet swollen filament to adhere directly thereto. The filament thereafter, as coated with the dusted blowing agent, may be passed through a heated tube to raise the temperature sufficient to cause evolution of gas from the blowing agent and simultaneously to dry the same.

As a slight modification of the last procedure, useful where the filament is formed of thermoplastic material, the thermoplastic filament may be passed through a bath containing an organic liquid such as a plasticizer liquid or, where a residual plasticizer coating is not desirable, a liquid which is more volatile and which volatile liquid has the effect merely to swell and soften the surface of the filament. Simultaneously the plasticizer or swelling liquid may contain the blowing agent dissolved or dispersed therein and thereby serves not only to swell the filament but to impregnate the same with blowing agent. Thereafter, the swollen thermoplastic filament is heated sufficient to evaporate the solvent and develop the gas from the blowing agent but insufficient to melt the filament and destroy its thermoplastic character. For example a thermoplastic filament such as linear polyamide, polyester, or polyacrilonitrile, etc., is first extruded through a spinneret and is then passed through a bath comprising a solution of dimethyl formamide and water having dissolved therein 3% of a blowing agent. The blowing agent may be heat activatable at a temperature below the fusing point of the filament material. Or the blowing agent may be activatable by acid such as sodium carbonate. The filament thus coated is dried and may be passed through a hot tube at a temperature merely high enough to activate the blowing agent without melting the filament material. Alternatively the coated filament, if coated with sodium carbonate, may be passed through a dilute aqueous bath of hydrochloric acid.

In an alternate procedure, the bath material may contain a film forming binder substance which serves to bind the blowing agent to the surface of the filament in a thin film coated thereover. Thus, for example, an extruded nylon or other thermoplastic filament may be passed through a bath containing a dilute solution of viscose, cellulose xanthate, etc. which further contains dissolved therein sodium carbonate. The filament is then dried with warm air and then passed through a bath which contains acid coagulating agents which serve both to regenerate the cellulose in the film and activate the sodium carbonate to develop gas bubbles in the surface.

The preformed filament is treated in a subsequent coating with the gas evolving agent in any adherent quantity such as 0.5 to 3% by weight of the plastic or more, the quantity being in no wise critical since as much as may be impregnated into the surface as a powder or dust may be used.

Suitable blowing agents for use herein where they are organic are usually diazo compounds and many are known in the art as gas developers activatable for this purpose over a wide range of temperatures and accordingly one is readily selected to evolve gas at the desired temperature. Typical examples are:

Phenylazo ethyl sulfone
Phenylazo isopropyl sulfone
Phenylazo n-butyl sulfone
p-Xenylazo ethyl sulfone
p-Chlorophenylazo ethyl sulfone
p-Chlorophenylazo methyl sulfone
p-Tolylazo methyl sulfone
Phenylazo methyl sulfone
2,5-dichlorophenylazo methyl sulfone
Phenylazo p-tolyl sulfone
p-Tolylazo phenyl sulfone
p-Chlorophenylazo-p-tolyl sulfone
p-Chlorophenylazo phenyl sulfone
p-Chlorophenylazo p-chlorophenyl sulfone 2,5-dichlorophenylazo-phenyl sulfone
Phenylazo-p-chlorophenyl sulfone
p-Tolylazo-p-chlorophenyl sulfone
p-Tolylazo-p-tolyl sulfone
Biphenylazo-p-tolyl sulfone
Diphenyl bis(azophenyl sulfone)4,4'
Di-p-tolyl bis(azophenyl sulfone)4,4'

These blowing agents decompose to evolve gas when heated to a temperature in the range of 80° to 200° C. For example, parachloro phenyl azo methyl sulfone would evolve gas when heated to 115–118° C. Other types of azo compounds are useful, for example, diazo amino benzene, alpha alpha-azo bis iso butyronitrile, various triazenes such as 1,3 bis (O-xenyl)-triazene which develop gas when heated at 130–135° C. and various members of this group decompose to develop gas at temperatures variable over the range of 115 to 140° C. For the chemical reactive type of gas evolving agent in addition to the sodium carbonate mentioned above, other inorganic carbonates may be used.

The organic type blowing agent is generally soluble in the organic plastic and the sodium carbonate would be soluble in the aqueous medium of the alkaline ripened cellulose or xanthate. The following examples illustrate the practice of this invention.

*Example 1*

Polyethylene terephthalate after melt extrusion into filament, and cooled to set the filament at ambient room temperature, is heated by passing the filament through a tube maintained at a temperature of 150° C. The filament is then passed through a pair of cold polished stainless steel tangential rollers on which powdered parachloro phenyl azo methyl sulfone was added by dusting on the rollers and the powder pressed by the tangential roll into the surface of the soft filament while cooling the same. The filament is again reheated to a temperature of 150° C. to decompose the gas evolving azo compound impregnated in the surface thereof. Thereafter the filament may be stretched, crimped, treated with plasticizing fluids, etc. as desired and the filament will be found under microscopic examination to have a series of pockmarks and surface pores caused by the decomposition of the powdered blowing agent adhered thereto.

*Example 2*

Polyhexamethylene adipamid has incorporated therein approximately 1% of sodium carbonate as fine powder milled to an average particle size of about 1 micron. It is melted and extruded through a spinneret and hardened as a multifilament batch in air and then passed through a tube through which is led wet steam at 100° C. containing 5% of hydrochloric acid gas and finally, led through a neutralizing bath containing .5% of sodium carbonate at a pH of about 8 and finally through a cold water washing bath and finally through a warm air drying tube. The filament is found to be surface porous dotted with tiny depressions.

*Example 3*

Polyethylene terephthalate having a molecular weight of about 65,000 is melt extruded to a filament, cooled in air to normal room temperature and then passed through a bath containing a viscose solution comprising originally about 6.5% of sodium hydroxide and 8% of cellulose, prepared in the conventional manner to which is added after ripening to an index of about 4 (sodium chloride) 4% of sodium carbonate and 1% of sodium lauryl sulfate as a wetting agent. The extruded filament is passed through this bath to pick up a coating of viscose thereover and then led into a second bath comprising the coagulating bath. The coagulating bath is an aqueous solution of 12% of sulfuric acid, 22% sodium sulfate, and 1.5% of zinc sulfate with a trace of a wetting agent such as sodium lauryl sulfate. The filament is found to have a fine porous coating of regenerated cellulose.

*Example 4*

In an alternate procedure, polyacrylonitrile of molecular weight of about 60,000 is mixed with 3% of parachlorophenyl azo phenyl sulfone extruded as a filament under a pressure of about 2,000 p. s. i. and a temperature of about 140° C. It is then cooled to room temperature in air and passed through the viscose bath having the composition as described in Example 3 to which no additional blowing agent was added. Thereafter, the viscose coated filament was passed through a coagulating bath as described in Example 4. Finally the filament was heated to 175° C. by passing through a heated tube. The filament was found to be porous throughout and substantially expanded.

The invention may be further described with reference to the drawings wherein,

Fig. 1 illustrates a magnified filament in section having pores formed in the surface thereof, Fig. 2 illustrates a magnified filament in section having an even plastic film coating about the filament core, the the coating alone having surface pores, Fig. 3 illustrates a magnified filament in section having an even plastic film coating thereabout with pores in both the internal filament core and the outer coating material, Fig. 4 illustrates the coating of filaments by applying heat decomposable powders and pressing the powder into the filament as described in Example 1 to produce a filament having surface porosity.

As shown in Fig. 1 an extruded filament 14 has pores 10 developed in the even extruded surface 12 of the filament body 14. Such pores may be developed as described in Example 1 and illustrated in Fig. 4 by applying a gas forming solid dust to the soft filament surface and pressing the dust into the surface. Thereafter the filament is heated to evolve gas. As illustrated all of the pores appear in the surface only.

Fig. 2 comprises an extruded filament core 14 of any thermoplastic organic character having an evenly applied surface film coating 16 thereabout, such as in the manner described in Example 3. Gas bubbles or pores 10 are subsequently developed as described in this example. It will be noted again that the surface pores are confined to the coating material.

Fig. 3 illustrates the type of filament produced by having a gas generating agent from which gas is generated by heat, such as an azo compound impregnated in the extruded filament core 18. That core is then coated with a viscose solution to produce an even surface film 20 thereon. That viscose solution also contains a gas evolving agent chemically developed by acid, such as sodium carbonate. The surface pores 10 are developed first in an acid contact bath. The outer film, even though porous, now has sufficient strength to reinforce the inner core to allow pores to be developed in the core substance 18 and such is developed by passing the filament having the porous outer coating and unexpanded pore forming agent in the core through a hot tube to develop pores in the internal core. Such procedure is described in Example 4.

Fig. 4 illustrates the coating of filaments with a gas forming dry powder as described in Example 1. A plurality of filaments 22 are passed between tangential rolls 24. The powder is supplied to the rolls by passing a gas, such as air, at ordinary temperature, through a tube 26 having a venturi 28 leading from a supply 30 of gas forming powder. The gas passes through tube 26, picks up a supply of powder from tube 28 and dusts it from nozzle 32 upon the tangential roll 24. The tangential roll presses the powder into the filament passing through the nip of the rolls. Thereafter the surface impregnated filament is passed into a heated tube 34 through which hot air is simultaneously passed to supply sufficient heat to decompose the powder in the surface of the filaments and thereby develop surface pores therein.

As thus described filaments are produced which have a porous texture. The entire filament may be expanded slightly by an internal gas content but primarily the surface itself of the filament is modified to impart tiny pores or semicircular holes comprising a surface irregularity. Yarns or bats formed from such filament tend to occlude greater quantities of gases and thereby have a high insulating effect. They are, moreover, more amenable to felting than synthetic filaments of conventional procedure. Final finishing treatments of the filament hereof such as stretching, coloring, washing, etc. including usual spinning operations may be applied.

I claim:

1. The method of modifying the surface texture of a synthetic organic thermoplastic extruded filament comprising incorporating a solid gas evolving agent in substantially only the surface portions of said filament and treating said filament to activate said gas evolving agent to develop pores substantially only in the surface of said filament.

2. The method as defined in claim 1 wherein the filament is formed by extrusion of a heat softened organic plastic material and the gas forming agent is applied as finely powdered solids impressed in the surface of the softened filament, said gas forming agent being of the character activatable to develop gas by reaction with a chemical solution, and the porous surface characteristics thereof being developed in the surface only by decomposition of said solids by passing the filament through a bath adapted to react with the gas forming agent.

3. The method of modifying the surface texture of synthetic organic thermoplastic extruded filament comprising incorporating a solid gas evolving agent in substantially only the surface portions of said filament, said solid gas-evolving agent being decomposable by heat at a temperature below the melting point of said filament and heating said filament to a temperature only sufficient to activate said gas evolving agent to evolve gas and thereby develop pores substantially only in the surface of said filament.

4. The method of modifying the surface texture of synthetic organic thermoplastic extruded filament comprising incorporating a solid organic gas-evolving azo compound in substantially only the surface portion of said filament, said azo gas-evolving compound being decomposable by heat to evolve gas at a temperature below the melting point of said filament, and heating said filament to a temperature only sufficient to activate said azo compound to develop pores substantially only in the surface of said filament.

5. The filament formed by the method defined in claim 1.

6. The filament formed by the method defined in claim 2.

7. The filament formed by the method defined in claim 3.

8. The filament formed by the method defined in claim 4.

References Cited in the file of this patent

UNITED STATES PATENTS

| | | |
|---|---|---|
| 1,427,330 | Rousset | Aug. 29, 1922 |
| 1,673,685 | Johnston et al. | June 12, 1928 |
| 1,829,904 | Lilienfeld | Nov. 3, 1931 |
| 2,034,008 | Taylor | Mar. 17, 1936 |
| 2,200,946 | Bloch | May 14, 1940 |
| 2,268,160 | Miles | Dec. 30, 1941 |